United States Patent
Michiie et al.

(10) Patent No.: US 7,142,730 B2
(45) Date of Patent: Nov. 28, 2006

(54) IMAGE PROCESSING APPARATUS

(75) Inventors: Norio Michiie, Tokyo (JP); Yasuhiro Hattori, Kanagawa (JP); Hiromitsu Shimizu, Tokyo (JP); Takao Okamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/261,532

(22) Filed: Oct. 31, 2005

(65) Prior Publication Data

US 2006/0050994 A1 Mar. 9, 2006

Related U.S. Application Data

(63) Continuation of application No. 09/731,724, filed on Dec. 8, 2000, now Pat. No. 6,980,702.

(30) Foreign Application Priority Data

Dec. 10, 1999 (JP) ............................. 11-352304

(51) Int. Cl.
G06K 9/54 (2006.01)

(52) U.S. Cl. .................... 382/305; 358/1.15; 358/1.16; 707/205; 715/514; 715/526

(58) Field of Classification Search ................. 358/1.9, 358/1.16, 1.15, 403; 382/305; 707/5, 1, 707/200, 205; 715/514, 526, 775
See application file for complete search history.

(56) References Cited

U.S. PATENT DOCUMENTS

| | | | |
|---|---|---|---|
| 5,367,692 A | 11/1994 | Edelman | |
| 5,764,866 A | 6/1998 | Maniwa | |
| 5,819,295 A | 10/1998 | Nakagawa et al. | |
| 5,839,014 A | 11/1998 | Takahashi et al. | |
| 5,933,247 A | 8/1999 | Shibata | |
| 5,969,828 A | 10/1999 | Kawasaki et al. | |
| 5,995,712 A | 11/1999 | Doi | |
| 6,094,276 A | 7/2000 | Yamaguchi et al. | |
| 6,098,077 A | 8/2000 | Sassa | |
| 6,243,340 B1 | 6/2001 | Ito et al. | |
| 6,263,118 B1 | 7/2001 | Kanno et al. | |
| 6,363,178 B1 | 3/2002 | Chiba et al. | |
| 6,415,307 B1 * | 7/2002 | Jones et al. | 715/525 |
| 6,421,070 B1 * | 7/2002 | Ramos et al. | 715/763 |
| 6,437,874 B1 | 8/2002 | Shibaki et al. | |
| 6,457,017 B1 | 9/2002 | Watkins et al. | |
| 6,477,528 B1 * | 11/2002 | Takayama | 707/5 |
| 6,587,222 B1 | 7/2003 | Nishikawa | |
| 6,590,674 B1 | 7/2003 | Orton | |
| 6,597,377 B1 * | 7/2003 | MacPhail | 715/738 |
| 6,606,161 B1 | 8/2003 | Murata | |
| 6,633,893 B1 * | 10/2003 | Yahara et al. | 707/205 |
| 6,701,319 B1 | 3/2004 | Yamane | |
| 6,734,988 B1 * | 5/2004 | Murata | 358/1.9 |
| 6,934,046 B1 * | 8/2005 | Nishikawa et al. | 358/1.15 |
| 6,980,702 B1 * | 12/2005 | Michiie et al. | 382/305 |
| 2002/0027675 A1 * | 3/2002 | Minato | 358/1.15 |

(Continued)

Primary Examiner—Gregory Desire
(74) Attorney, Agent, or Firm—Oblon, Spivak, McClelland, Maier & Neustadt, P.C.

(57) ABSTRACT

An image processing apparatus including an image storage for storing image data is disclosed. A first managing section generates first management information for managing the image data, which are to be stored in the image storage, on a single unit image basis. A second managing section generates second management data for managing one or more unit images as a single image file. An image data managing method for the image processing apparatus is also disclosed.

9 Claims, 17 Drawing Sheets

U.S. PATENT DOCUMENTS

2005/0088680 A1* 4/2005 Ahn .......................... 358/1.14
2006/0050994 A1* 3/2006 Michiie et al. ............. 382/305

* cited by examiner

Fig. 12

| (BLOCK NO.) | (LOCATION) | (OCCUPIED/ UNOCCUPIED) |
|---|---|---|
| 0 0 0 | 0 1 0 0 0 | 1 |
| 0 0 1 | 0 1 1 0 0 | 1 |
| 0 0 2 | 0 1 2 0 0 | 0 |
| 0 0 3 | 0 1 3 0 0 | 1 |
| 0 0 4 | 0 1 4 0 0 | 0 |

| (FILE NAME) | (POINTER) |
|---|---|
| Scan 004 | 0 0 7 5 0 |
| Word. doc | 0 0 8 3 0 |
| Yosan. txt | 0 0 6 6 0 |

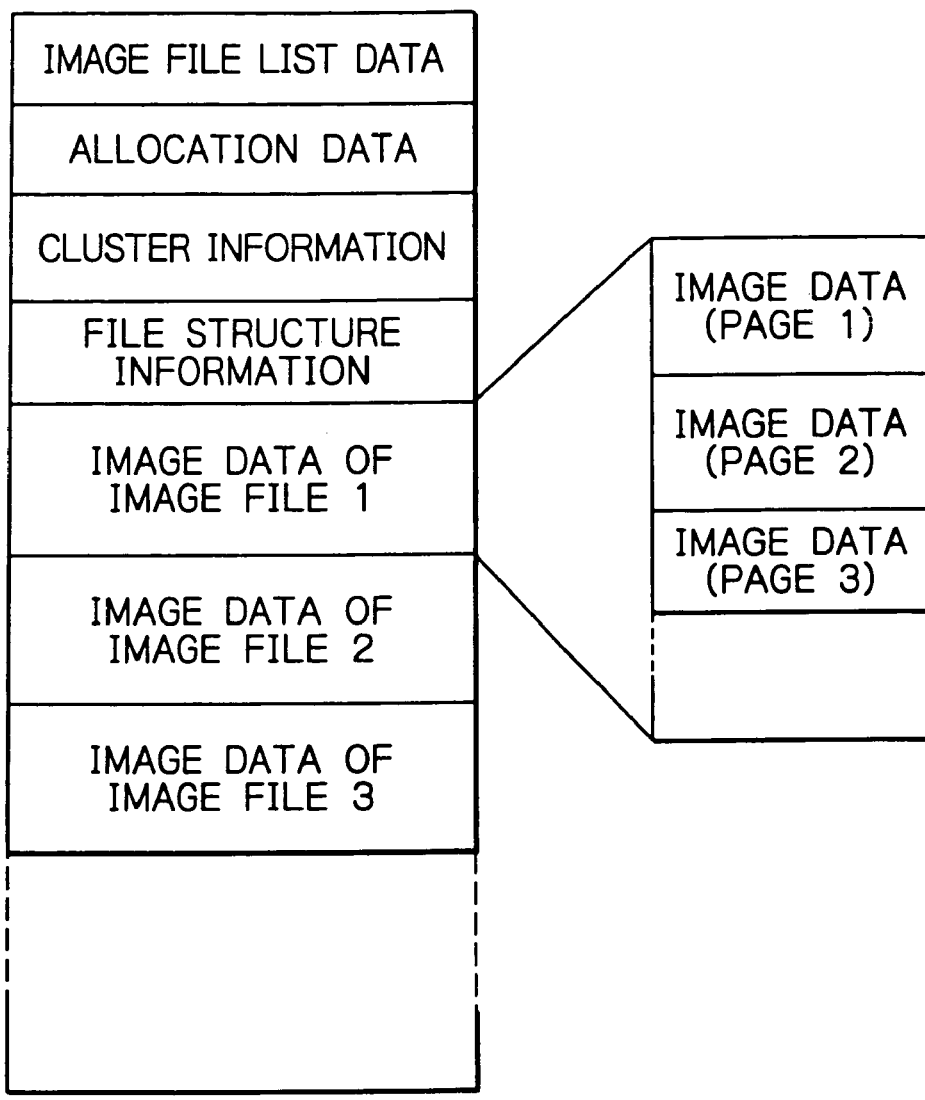

Fig. 19

| (IMAGE NO.) | (IMAGE START ADDRESS) | (IMAGE SIZE) |
|---|---|---|
| 0001 | 00750 | 2 |
| 0002 | 00770 | 3 |
| 0003 | 00800 | 2 |
| 0004 | 00820 | 1 |

Fig. 20

| | (OCCUPIED/ UNOCCUPIED) | (ADDRESS OF NEXT BLOCK) |
|---|---|---|
| 0 | 1 | 00760 |
| 1 | 1 | END |
| 2 | 1 | 00780 |
| 3 | 1 | 00790 |
| 4 | 1 | END |

Fig. 21

| (FILE NO.) | (IMAGE NO.) |
|---|---|
| 001 | 0001,0002,0003,0004 |
| 002 | 0005,0006 |
| 003 | 0007,0008,0009 |

IMAGE PROCESSING APPARATUS

CROSS-REFERENCE TO RELATED APPLICATIONS

The present application is a continuation of U.S. application Ser. No. 09/731,724 filed Dec. 8, 2000, now U.S. Pat. No. 6,980,702, and in turn claims priority to JP 11-352304 filed on Dec. 10, 1999, the entire contents of each of which are hereby incorporated herein by reference.

BACKGROUND OF THE INVENTION

The present invention relates to a digital copier or similar image processing apparatus and more particularly to an image processing apparatus capable of storing mass image data.

Today, a digital copier of the type including a semiconductor memory, large-capacity hard disk or similar image storing means for storing document image data is available. This type of digital copier is capable of producing a plurality of copiers of a document by scanning the document only once or electronically sorting prints in order of page. Also, the copier is capable of storing image data output from a scanner or image data representative of text codes arranged in a bit map in a large-capacity hard disk, so that the image data can be output in the future.

Further, the image data stored in the hard disk can be transferred to a storing medium removably mounted to the copier for a backup or a long-time storage purpose. More specifically, the digital copier is provided with an external image storing device and an internal image storing device. The external image storing device writes or reads image data in or out of the removable storing medium. The internal image storing device stores image data read out of documents or image data transferred from the external image storing device. The removable storing medium may be implemented as a CD-R (CD Readable), CD-RW (CD-ReWritable), large capacity DVD (Digital Versatile Disk), data tape or similar mass storing medium.

Japanese Patent Laid-Open Publication No. 63-146555, for example, discloses an image processing apparatus constructed to store information and an operation procedure program necessary for copying in a removable storing medium together with image data. This apparatus is directed toward efficient manual operation.

Japanese Patent Laid-Open Publication No. 1-256269 teaches an image processing apparatus capable of storing not only image data but also information representative of the date of storage of the image data in a removable storing medium. This apparatus allows the image data to be rapidly read out when they are again printed on paper sheets.

It is a common practice with a conventional image processing apparatus including the internal image storing device, removable storing medium or similar image storing means to store image data representative of one or more pages, e.g., a single document in the storing means as a single image file. A particular file name is attached to each image file for management. When the operator of the apparatus selects a desired file name out of a list of file names or inputs it, an image file designated by the file name is read out of the image storing means on a file basis. The image data of the image file read out are displayed or printed on a paper sheet, as desired. Information indicative of correspondence between the image file names or file numbers and the locations thereof in the image storing means is prepared as management information. When the operator designates a desired image file name, the apparatus accesses the location of the image storing means corresponding to the image file name and reads out an image file designated by the image file name.

The above described image processing apparatus, however, has the following problem left unsolved. The image data to be stored in the image storing means are managed on the basis of a single image file including one or more pages, as stated earlier. It is therefore impossible to read out only particular pages out of a plurality of pages, e.g., page 1 of an image file A and page 2 of an image file B. To print, e.g., only a particular page of a single image file, it has been customary to read the entire image file including the particular page out of the image storing means, causing the operator to select the particular page, and then output the page selected. Such a procedure is time-consuming. This problem is more serious when use is made of a removable storing-medium whose reading rate is low or when an image file includes a number of pages.

SUMMARY OF THE INVENTION

It is therefore an object of the present invention to provide an image processing apparatus capable of reading the entire designated data made up of a plurality of pages and stored in an image storing means or only desired part of the entire image data, as desired.

BRIEF DESCRIPTION OF THE DRAWINGS

The above and other objects, features and advantages of the present invention will become more apparent from the following detailed description taken with the accompanying drawings in which:

FIG. 12 is a table listing specific location management information included in the format of FIG. 11;

FIG. 13 is a table listing specific image attribute management data also included in the format of FIG. 11;

FIG. 14 is a table listing specific image file names and specific pointers;

FIG. 17 is a view showing a specific format of information representative of an alternative embodiment of the present invention;

FIG. 18 is a table listing specific records each corresponding to a particular image file included in the format of FIG. 17;

FIG. 19 is a table listing specific allocation data;

FIG. 20 is a table listing specific cluster information;

FIG. 21 is a table listing specific file information; and

DESCRIPTION OF THE PREFERRED EMBODIMENTS

Figure 1:
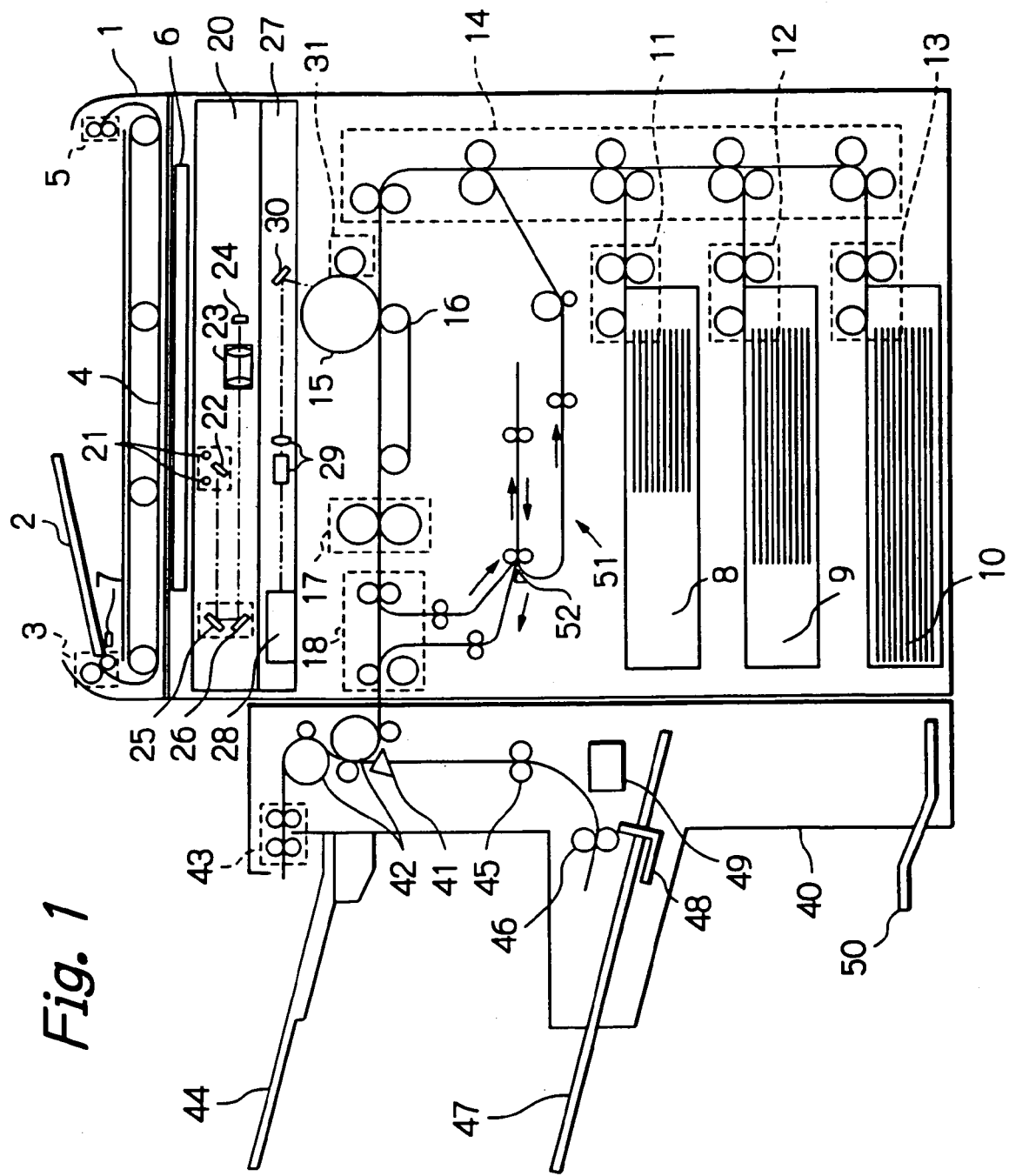
FIG. 1 is a view showing an image processing apparatus embodying the present invention.

Referring to FIG. 1 of the drawings, an image processing apparatus embodying the present invention is shown and includes an ADF (Automatic Document Feeder) 1. The operator of the apparatus stacks documents on a tray 2, which is included in the ADF 1, face up. The operator then presses a start key arranged on an operation panel, which will be described specifically later. In response, a feed roller 3 and a belt 4 cooperate to sequentially feed the bottom document to the top document to a preselected position on a glass platen 6. The apparatus has a function of counting the documents every time the feed of one document completes.

A reading unit 20 reads the image of the document positioned on the glass platen 6. The belt 4 and a discharge roller 5 cooperate to discharge the document read by the reading unit 20. When a document sensor 7 senses another document present on the tray 2, the document is conveyed to the glass platen 6 in the same manner as the previous document.

A first, a second and a third tray 8, 9 and 10 each are loaded with a stack of paper sheets. A first, a second and a third paper feeder 11, 12 and 13 feed the paper sheets from the first, second and third trays 8, 9 and 10, respectively. A vertical conveying unit 14 conveys the paper sheet fed from any one of the trays 8 through 10 to a position where the paper sheet contacts a photoconductive element 15. In the illustrative embodiment, the photoconductive element 15 is implemented as a drum. A writing unit 27 scans the drum 15 with a laser beam in accordance with image data output from the reading unit 20 to thereby form a latent image. A developing unit 31 develops the latent image and thereby produces a corresponding toner image. The toner image is transferred from the drum 15 to the paper sheet being conveyed by a belt 16 at a speed equal to the rotation speed of the drum 15. A fixing unit 17 fixes the toner image on the paper sheet. A paper discharging unit 18 discharges the paper sheet carrying the fixed image thereon to a finisher 40.

The finisher 40 selectively guides the paper sheet toward discharge rollers 42 or a stapling section. Specifically, a path selector 41 steers the paper sheet toward a print tray 44 via the discharge rollers 42 when positioned upward or steers it toward a staple tray 47 via rollers 45 and 46. Every time a paper sheet is driven out to the staple tray 47, a jogger 48 positions the edge of the paper sheet.

When a single copy, i.e., a single set of copies is completed on the staple tray 47, a stapler 49 staples it. The stapled copy drops onto a tray 50 due to its own weight. The print tray 44 is movable in a direction perpendicular to the direction of paper conveyance for every document or for an automatically sorted copy, thereby sorting prints.

In a duplex mode for forming images on both sides of a paper sheet, a path selector 52 is positioned upward. In this condition, the paper sheet fed from any one of the trays 8 through 10 and carrying an image on one side thereof is not steered toward the finisher 40, but is steered toward and laid on a refeeding unit 51. The refeeding unit 51 again feeds the paper sheet toward the drum 15, so that an image is formed on the other side of the paper sheet. At this instant, the path selector 52 is positioned downward in order to steer the above paper sheet, or duplex print, toward the path selector 41 included in the finisher 40.

A main motor, not shown, drives the drum 15, belt 16, fixing unit 17, paper discharging unit 18, and developing unit 31. The rotation of the main motor is transferred to the paper feeders 11 through 13 via clutches. Also, the rotation of the main motor is transferred to the vertical conveying unit 14 via an intermediate clutch.

The reading unit 20 includes scanning optics in addition to the glass platen 6. The scanning optics includes lamps 21, a first mirror 22, a lens 23, and a CCD (Charge Coupled Device) image sensor 24. The lamps 21 and first mirror 22, as well as a second mirror 25 and a third mirror 26, are mounted on a carriage not shown. A scanner motor, not shown, drives the scanning optics. The CCD image sensor 24 reads the image of a document and outputs a corresponding electric signal.

The writing unit 27 includes a laser unit 28, a lens 29 and a mirror 30. The laser unit 28 accommodates a laser diode and a polygonal mirror. A motor, not shown, causes the polygonal mirror to rotate at a high, constant speed.

The writing unit 27 emits a laser beam so as to scan the surface of the drum 15. A beam sensor, not shown, adjoins one end of the drum 15 and outputs a main scan synchronizing signal by sensing the laser beam.

Figure 2:
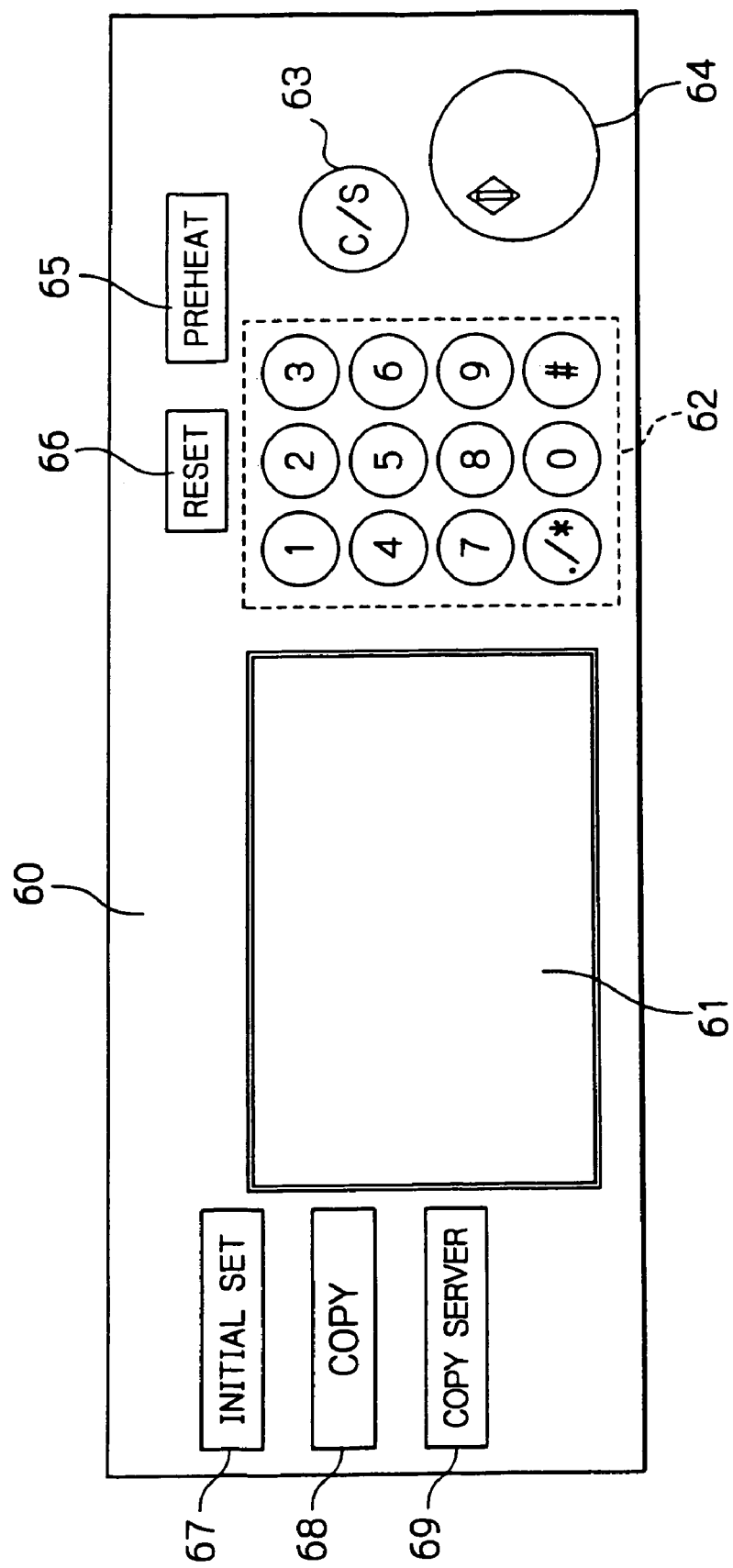
FIG. 2 is a fragmentary plan view of an operation panel included in the illustrative embodiment.

FIG. 2 shows a specific configuration of an operation panel 60 included in the illustrative embodiment. As shown, the operation panel 60 includes an LCD (Liquid Crystal Display) touch panel 61, numeral keys 62, a clear/stop key 63, a print key 64, a preheat key 65, a reset key 66, an initial set key 67, a copy key 68, and a copy server key 69. The touch panel 61 displays function keys, the number of copies, messages representative of the statuses of the apparatus, and so forth.

By pressing the initial set key 67, it is possible to customize the initial conditions of the apparatus, as desired. With the key 67, it is also possible to set the sizes of paper sheets disposed in the apparatus or to set desired conditions to occur when a mode clear key, not shown, assigned to a copying function is pressed. Further, the key 67 allows an application to be selected when the operation panel 60 is not operated over a preselected period of time to be set. In addition, the key 67 allows a transition time to a power saving state to be set or allows a transition time to an automatic off/sleep mode to be set.

When the preheat key 65 is pressed, the apparatus in a stand-by state enters into a power saving state and lowers a fixing temperature and turns off indications on the operation panel 60. The copy server key 68 is used to execute a copy server function that shifts or copies image data stored in a video memory, not shown, built in the apparatus to or in an external image memory not shown. The copy server will be described specifically later.

Figure 3:
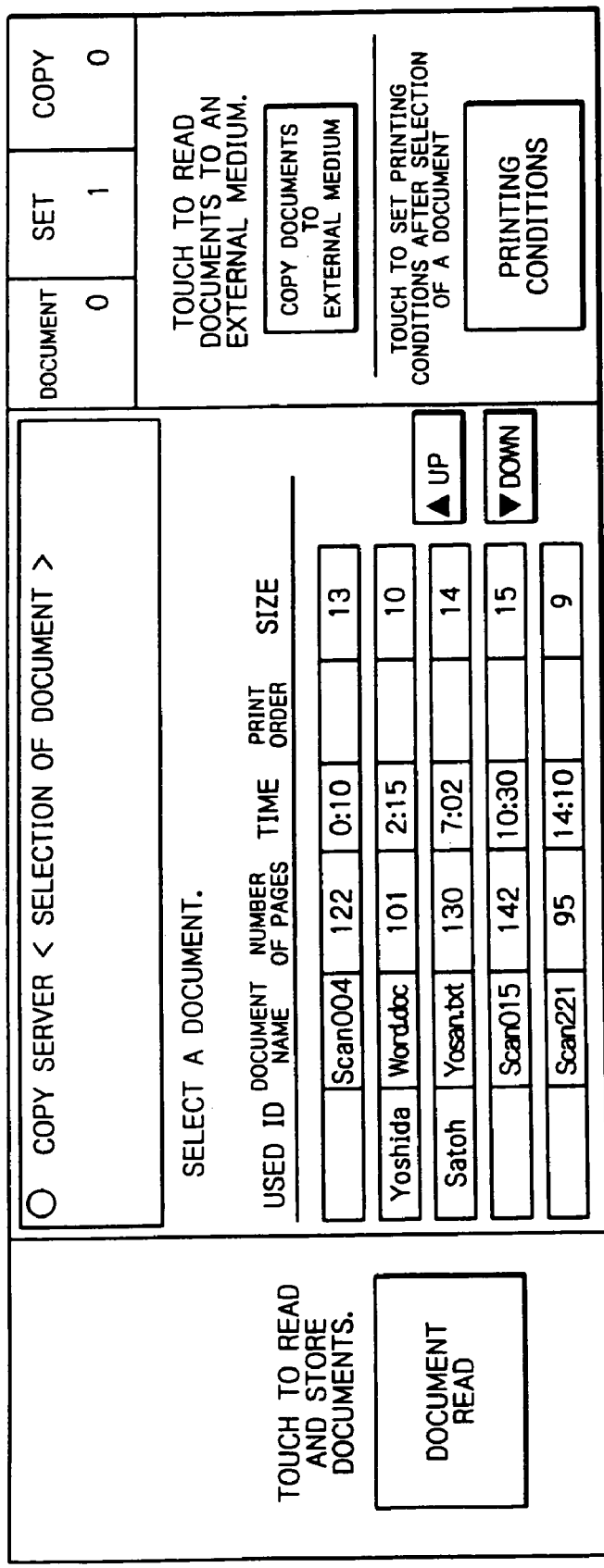
FIG. 3 is a view showing a specific picture to appear on an LCD (Liquid Crystal Display) touch panel mounted on the operation panel.

FIG. 3 shows a specific picture to appear on the touch panel 61 when the copy server key 69 is pressed. When the operator touches any one of keys included in the specific picture, the key is reversed to black while a function associated with the key is set up. When the operator, intending to input details of the function selected (e.g. printing conditions), touches a preselected key, a picture for inputting the details appears on the touch panel 61 in place of the picture shown in FIG. 3. The touch panel 61 is implemented by a dot display and can therefore graphically display adequate information in accordance with the instantaneous circumstance.

The picture shown in FIG. 3 includes various image control information for specifying the image data stored in the internal video memory, i.e., user IDs (identification), document names, numbers of pages, times of storage, a printing order, and sizes (amounts of data). A user ID is assigned by a printer driver included in a personal computer, which is connected to the apparatus, and therefore displayed only at the time of storage using the printer function. A document name is attached every time an image is stored. A number of page is representative of the number of document images stored. A time of storage is representative of the time of storage of image data. A printing order is assigned when a plurality of image data stored are to be printed. Such image management information are stored in an NV-RAM (Non-Volatile Random Access Memory). The picture shown in FIG. 3 additionally includes a key labeled "Copy to External Medium". This key may be pressed to copy image information (image data and image management information) in an external image memory.

Figure 4:
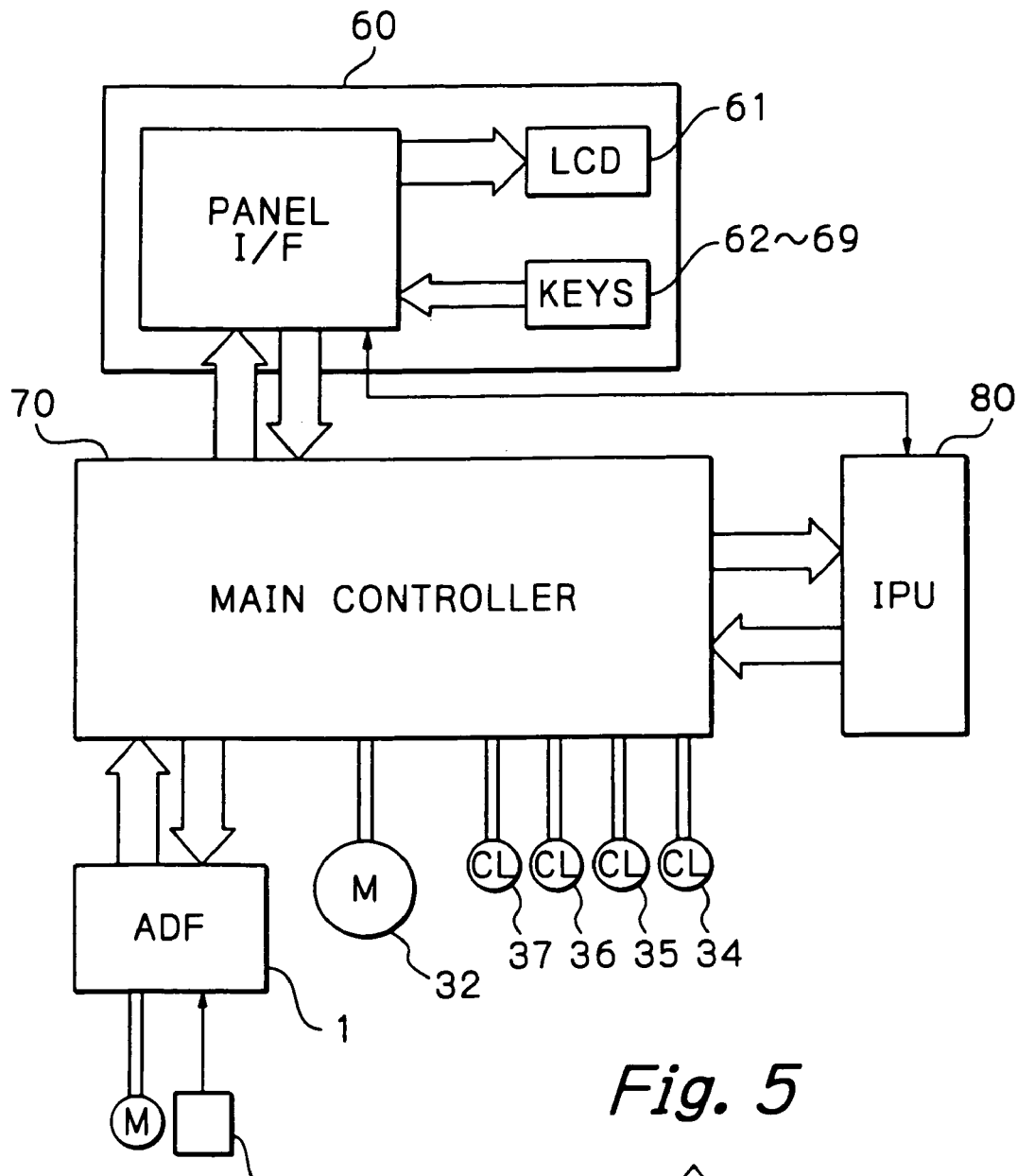
FIG. 4 is a block diagram schematically showing a control system included in the illustrative embodiment.

FIG. 4 shows a control system including a main controller 70. The main controller 70 controls the entire apparatus. The operation panel 60 is connected to the main controller 70. Also connected to the main controller 70 are an image processing unit (IPU) 80 and the ADF 1. The IPU 80 controls a scanner, controls the writing of document image data in the video memory, and controls image formation to be executed with the image data stored in the video memory. Further connected to the main controller 70 are a main motor 32 and clutches (CL) 34, 35, 36 and 37 necessary for, e.g., paper conveyance.

Figure 5:
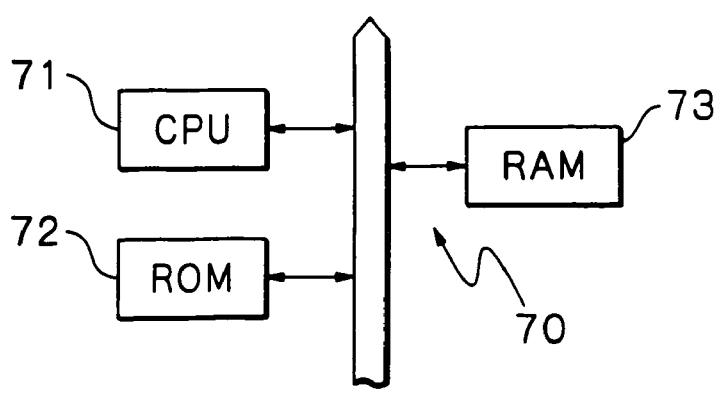
FIG. 5 is a schematic block diagram showing a main controller included in the control system specifically.

FIG. 5 shows essential part of the main controller specifically. As shown, the main controller 70 includes a CPU (Central Processing Unit) 71, a ROM (Read Only Memory) 72 storing a program to be executed by the CPU 71, and a RAM 73 for storing, e.g., interim data. If desired, the program may be partly stored in the ROM 72 and partly loaded from a hard disk drive, not shown, to the RAM 73.

Figure 6:
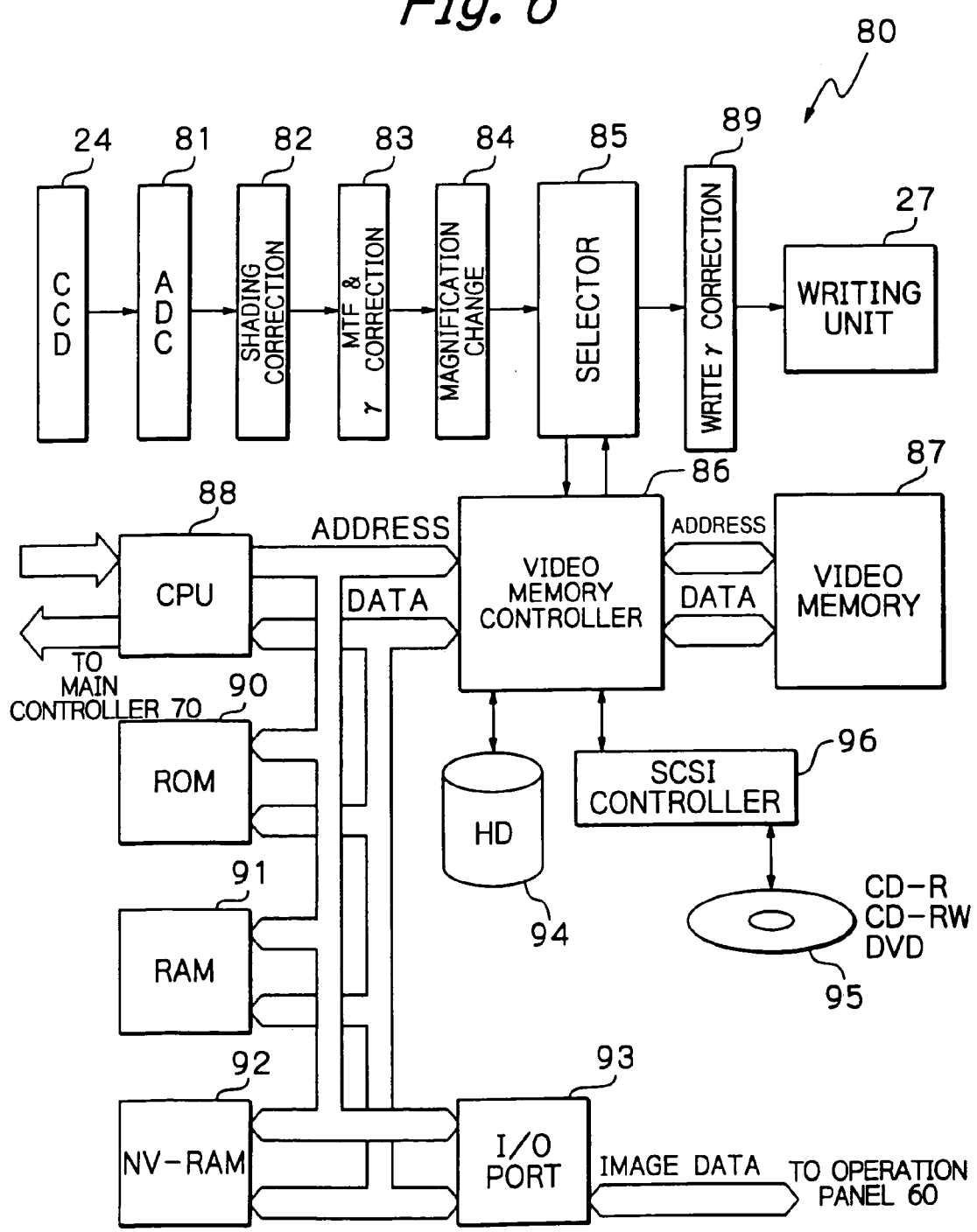
FIG. 6 is a schematic block diagram showing an image processing unit also included in the control system specifically.

Reference will be made to FIG. 6 for describing a specific configuration of the IPU 80. As shown, the IPU 80 includes the CCD image sensor 24 for transforming a reflection from a document, which is illuminated by the lamps 21, to an electric signal. An ADC (Analog-to-Digital Converter) 81 converts the electric signal to a digital signal or image data. A shading correction 82 executes shading correction with the image data. An MTF (Modulation Transfer Function) and γ correction 83 executes MTF and γ correction with the image data output from the shading correction 82. A magnification change 84 executes enlargement or reduction with the image data output from the correction 83 in accordance with a magnification change ratio selected. A selector 85 selectively delivers the image data output from the magnification change 84 to a write γ correcting unit 89 or a video memory controller 86. The write γ correcting unit 89 corrects the write γ of the image data in accordance with image forming conditions and feeds the corrected image data to the writing unit 27.

The video memory controller 86 and selector 85 are capable of interchanging image data with each other. The IPU 80 additionally includes a CPU 88, a ROM 90, a RAM 91, and an NV-RAM 92. The CPU 88 controls the setting of the video memory controller 86 and controls the reading unit 20 and writing unit 27. The ROM 90, RAM 91 and NV-RAM 92 store a program meant for the CPU 88 and data.

The CPU 88 is capable of writing and reading data out of a video memory 87 via the video memory controller 86.

The video memory controller 86 includes a section for compressing the image data input via the selector 85. The compressed image data are written to the video memory 87. Image data with 256 tonality levels, which corresponds to the largest image size, may be directly written to the video memory 87 without compression, if desired. The illustrative embodiment compresses the image data in order to effectively use the limited capacity of the video memory 87. Further, the compression allows mass image data to be stored in the video memory 87 at a time, so that in a sort mode the image data can be read out of the video memory 87 in order of page. An expanding section also included in the video memory controller 86 sequentially expands the image data read out of the video memory 87.

Furthermore, image data representative of a plurality of documents may be sequentially written to the divided portions of the area of the video memory 87 corresponding to a single paper sheet. For example, image data representative of four documents may be sequentially written to the quadrisect areas of the video memory 87 corresponding to a single paper sheet. In such a case, the four documents will be combined and printed on a single paper sheet.

The CPU 88 is capable of accessing the image data stored in the video memory 87. This allows the image data stored in the video memory 87 to be reduced, cut out or otherwise processed. This can be done by writing control data in a register included in the video memory controller 86. The processed image data are again written to the video memory 87.

The video memory 87 is divided into a plurality of areas in accordance with the size of image data to be processed, so that the input and output of image data can be executed at the same time. For this purpose, the video memory 87 is interfaced to the video memory controller 86 by two sets of address and data lines, one for reading and the other for writing. This configuration allows image data to be written to, e.g., an area 1 and allows image data to be read out of an area 2 at the same time.

Further, the CPU 88 is capable of transferring the image data read out of the image data to the operation panel 60 via an I/O (Input/Output) port 93. Because display resolution available with the operation panel 60 is generally low, the image data read out of the video memory 87 are reduced, or thinned, and then sent to the operation panel 60.

A hard disk drive 94 may be used in addition to the video memory 87 because the video memory 87 stores mass image data. The hard disk drive 94 permanently stores image data even when a power switch provided on the apparatus is turned off. In this case, the video memory 87 and hard disk drive 94 constitute the internal memory or image storing means. The video memory 87 constitutes the image storing means alone when the hard disk drive 94 is absent. It is a common practice to use the hard disk drive 94 when a plurality of regular or formatted documents are read by a scanner and stored.

An external image storing device 95 includes a removable storing medium, e.g., CD-R, CD-RW or DVD. An SCSI (Small Computer System Interface) controller 96 controls the bus of the external image storing device 95 in the event of writing or reading of image data. At this instant, the image data are once written to the video memory 87 in order to absorb differences between the above writing or reading operation and the image formation and read-out from the scanner. More specifically, image data output from the scanner are written to the external image storing device 95 by way of the video memory 87 without exception. Also, image data readout of the external image storing device 95 are sent to the writing unit 27 by way of the video memory 27 without exception.

Figure 8:
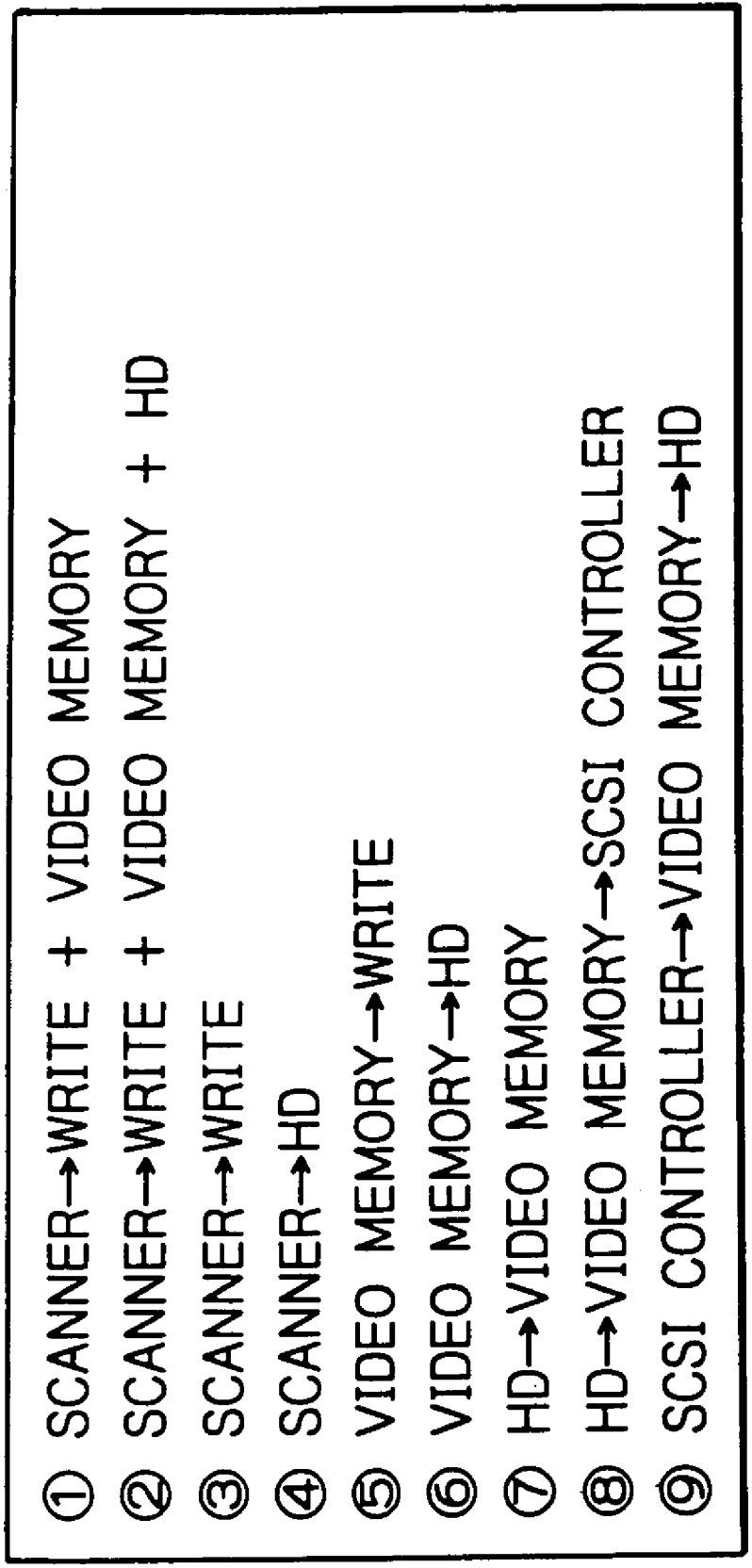
FIG. 8 is a table listing exemplary video paths available with the illustrative embodiment.

The video memory controller 86 determines a video path when image data are written to or read out of the video memory 87, hard disk drive 94 or external image storing device 95, when image data output from a scanner (e.g. reading unit 20) are input, or when the image data to be sent to the writing unit 27 are output. FIG. 8 shows some specific video paths. The CPU 88 determines the destination of image data to be input or output, allowing the video memory controller 86 to switch the flow of image data.

Figure 7:
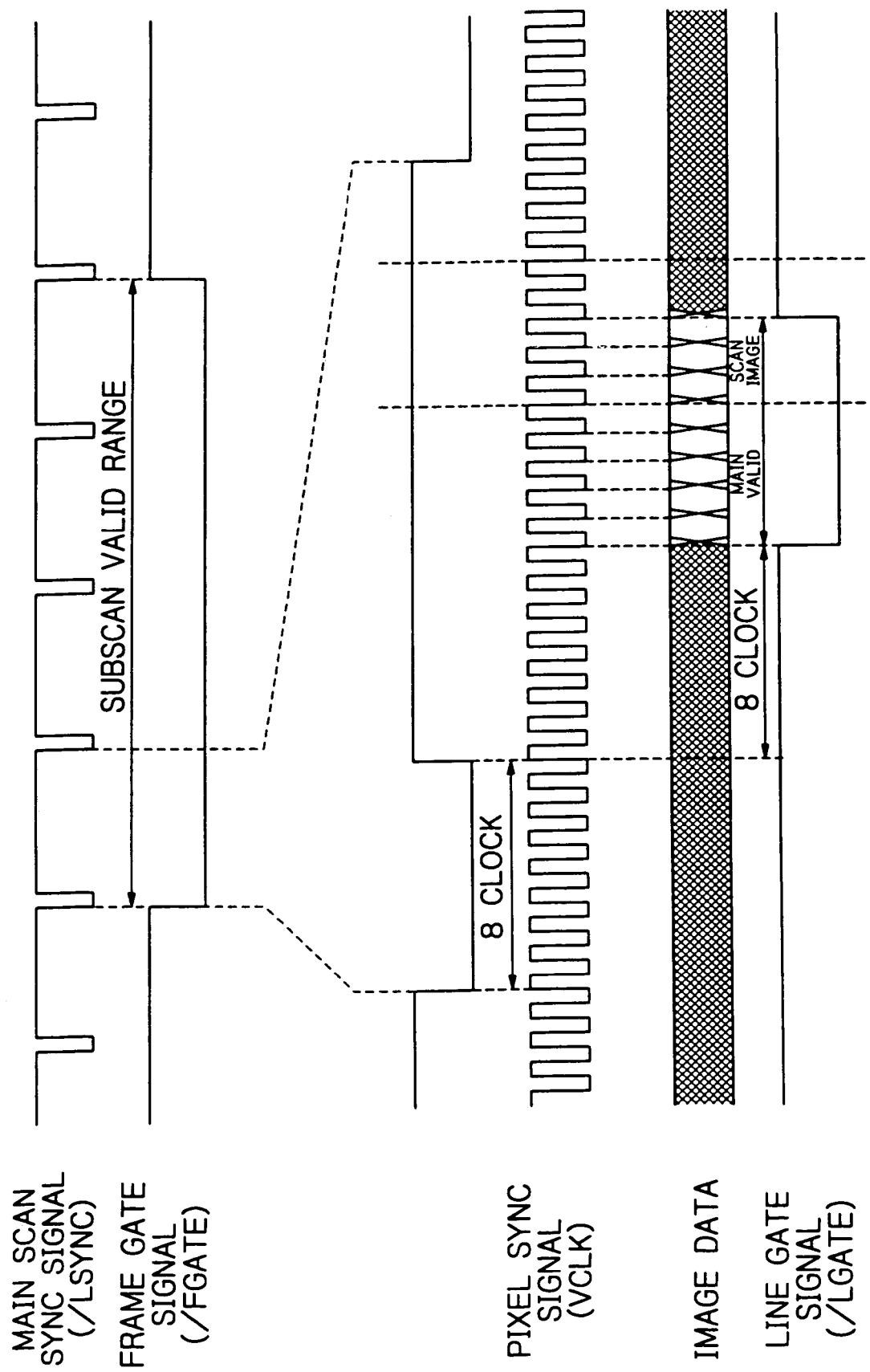
FIG. 7 is a timing chart demonstrating a specific operation of the control system.

FIG. 7 shows a specific transfer timing of one page of image data via the selector 85. In FIG. 7, /FGATE is representative of a valid period of one page of image data in the subscanning direction. /LSYNC is representative of a line-by-line main scan synchronizing signal; the image data is validated by a preselected clock after the positive-going edge of the signal /LSYNC. A signal /LGATE indicates that the image data in the main scanning direction is valid. These signals are synchronous to a pixel clock VCLK. A single pixel, eight bits (256 tonality levels) of data is input to the selector 85 for a single period of the pixel clock VCLK. In the illustrative embodiment, image data are printed on a paper sheet at a density of 400 dpi (dots per inch) while the maximum number of pixels is 4,800 in the main scanning direction and 6,800 in the subscanning direction. Also, image data are assumed to approach a white image as they approach 255.

Figure 9:
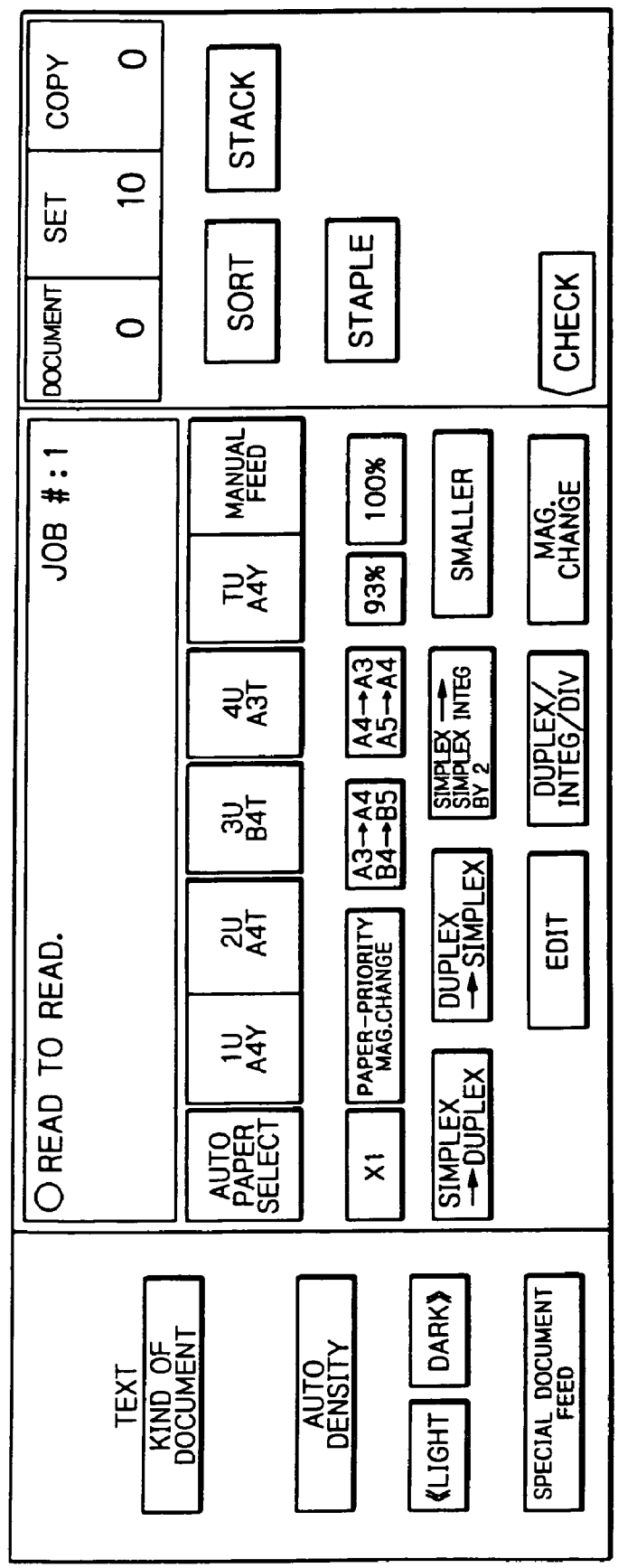
FIG. 9 is a view showing a specific picture associated with a copy application installed in the illustrative embodiment.

FIG. 9 shows a specific picture available with a copy application, which is one of applications installed in the apparatus. The copy application is conventional and will be note described specifically.

Figure 10:
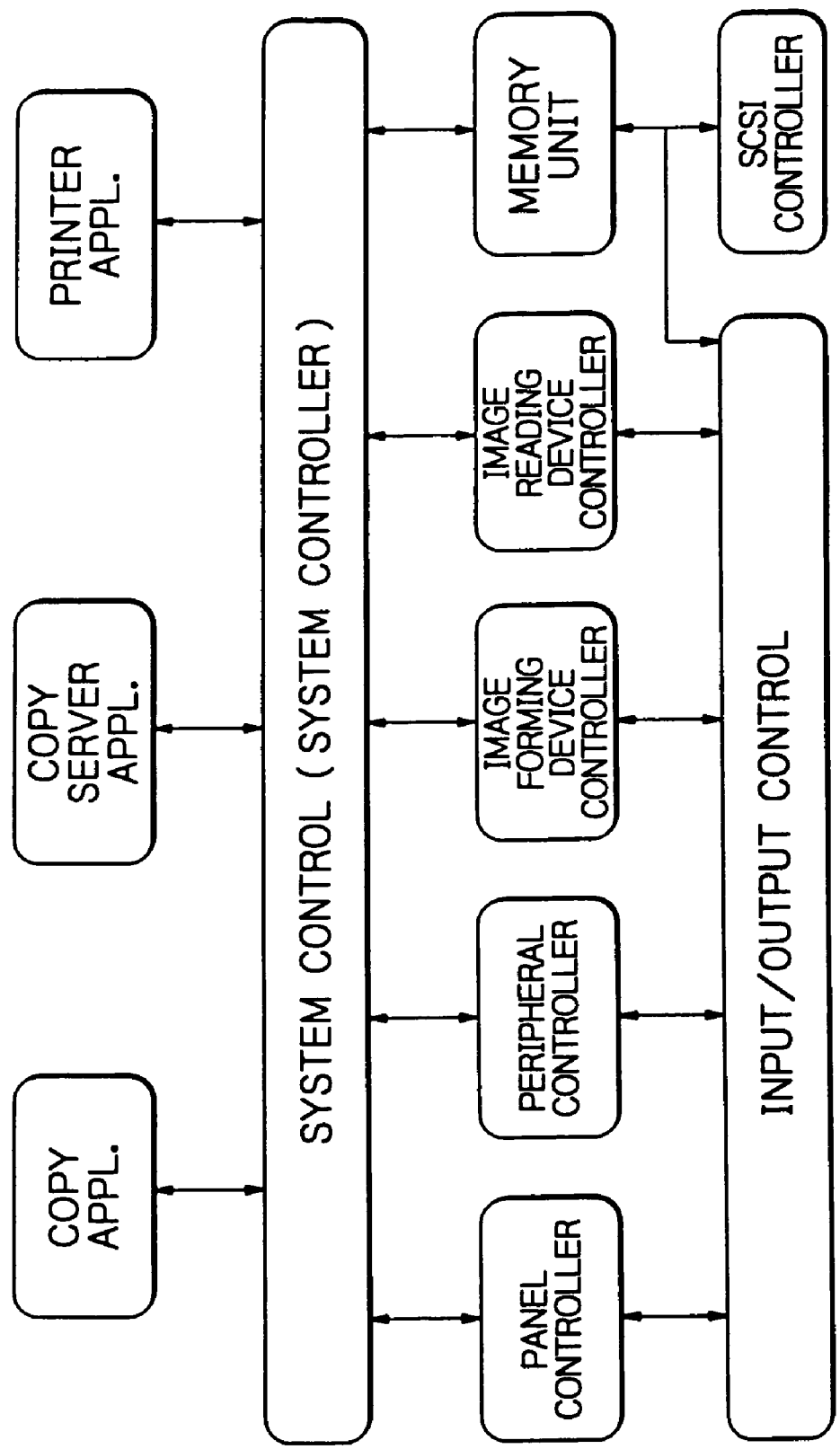
FIG. 10 is a schematic block diagram showing the system of the illustrative embodiment.

Reference will be made to FIG. 10 for describing a specific system configuration of the apparatus. As shown, the system includes a copy server application processing section (COPY SERVER APPL.) consisting of hardware and software. This processing section plays the role of means for processing the image data stored in the internal image storing device. The system additionally includes a copy application processing section (COPY APPL.) and a printer application processing section (PRINTER APPL.). These processing sections each operate independently of the others. A system controller arbitrates the operation panel, or shared resource, 60 and a panel, a peripheral unit (e.g. ADF 1) and a peripheral unit controller, an image forming device (e.g. writing unit 27) and a device controller, the image reading device (e.g. reading unit 20) and a device controller, and a memory unit. Such controllers are implemented by the main controller 70 and IPU 80.

Operation picture information associated with the application processing sections each can be written in a particular virtual picture region provided by the panel controller (memory region corresponding to an actual picture). More specifically, the panel controller arranges the operation picture information designated by the system controller in an actual picture and displays it. When the external image storing device 95 is implement as a unit separate from the apparatus, it is connected to the connection portion of the SCSI controller 96, FIG. 5, and controlled by the SCSI controller 96.

In the illustrative embodiment, the apparatus includes first, second and third managing means. The first managing means generates and manages first management information for managing the image data stored in the internal image storing means and external storing means on a unit image basis. The second managing means generates and manages second management information for managing one or more unit images as a single image file. The third managing means generates and manages a list of image files as third management information. The main controller 70, FIGS. 4 and 5, implements the first to third managing means. In the illustrative embodiment, the internal storing means is the hard disk drive 94 or the RAM 73. The file configuration and operation of the illustrative embodiment will be described hereinafter.

Figure 11:
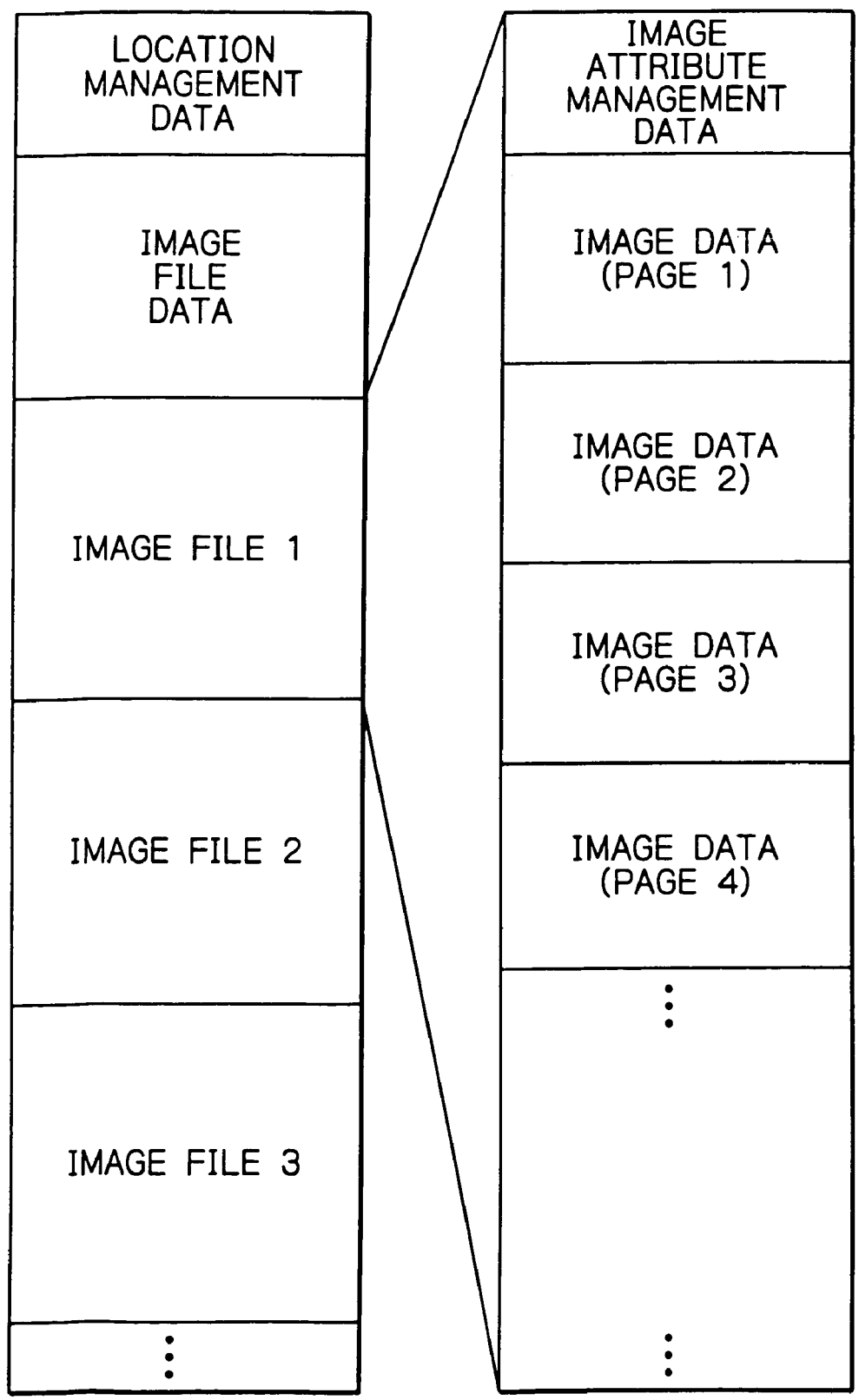
FIG. 11 is a view showing a specific format of information generated by the main controller.

FIG. 11 shows a group of information generated by the main controller 70 and including the first to third management information. The group of information is stored in the hard disk drive 94 or the external image storing device 95. In FIG. 11, image attribute management information constitutes part of the first and second management data while image file list information corresponds to part of the second management data and the third management information.

As shown in FIG. 11, the first field stores location management data. FIG. 12 shows a specific arrangement of the location management data. As shown, the location management data is made up of a block number (Block No.), location information (Location), and occupied/unoccupied information (Occupied/Unoccupied). As for a block number, a continuous image data region for storing a plurality of image data is divided into a plurality of blocks of the same size, and serial numbers are assigned to the consecutive blocks. A region allocated to the image attribute management data is independent of the image data region and has a smaller block size than the image data blocks.

The location information is indicative of the location of the head of each block and implemented by serial numbers sequentially attached to the consecutive storage units of the image storing means (e.g. sectors in the case of a hard disk) Because the block size is fixed, only the location information of the first block may be set, if desired. In such a case, the locations of the other blocks will be calculated on the basis of the block number. The word "occupied" means that the block stores valid image data; "1" and "0" are assigned to "occupied" and "unoccupied", respectively.

The field next to the location management data field stores image file list data, e.g., file names attached to image files stored in the image data region. In addition, the above field stores pointer information representative of the heads of the image files in one-to-one correspondence to the file names. This field may further store the user IDs and the number of pages shown in FIG. 3, if desired.

The image file list data field is followed by consecutive image file fields each including an image data region, which stores image data, and an image attribute management data region. Specifically, as shown in FIG. 11, each image file stores image attribute management data at its apparent head. When unit images constituting the image file are page images, image data representative of the first page and successive pages are sequentially stored after the image attribute management data. However, the region where the image data are stored is not always continuous. That is, the illustrative embodiment references the location management data in order to obtain the block numbers attached to unoccupied blocks and then sequentially writes the image data in the unoccupied blocks. Further, if one page of image data overflows one block, then the image data will be discontinuous.

In light of the above, the image attribute data region stores the block numbers attached to the unit images (pages in the illustrative embodiment), which constitute a single file. FIG. 13 shows specific image attribute management data. FIG. 13 shows that a single image file is made up of four consecutive pages, that the first page, for example, is stored in a block designated by a block No. 001, and that the second page is stored in three blocks designated by block Nos. 003, 004 and 007. The image attribute management data region additionally stores attribute information attached to image data output from, e.g., a scanner. For example, the attribute information includes paper size information, simple/duplex copy information, print mode information and information for search, which may be used to print image data on paper sheets.

With the first and second management information, the illustrative embodiment allows the entire image file or only designated part of the image file to be selectively output.

Assume that a removable storing medium, e.g., CD-RW is mounted to the external image storing device 95, and that one of image data stored in the hard disk drive 94 is written to the storing medium. How the location management data, image attribute management data and image file list data are generated and used under the above situation will be described with reference to FIG. 15. It is to be noted that in the illustrative embodiment the main controller 70 generates and uses the management data. The storing medium is assumed to have stored some image files beforehand.

Figure 15:
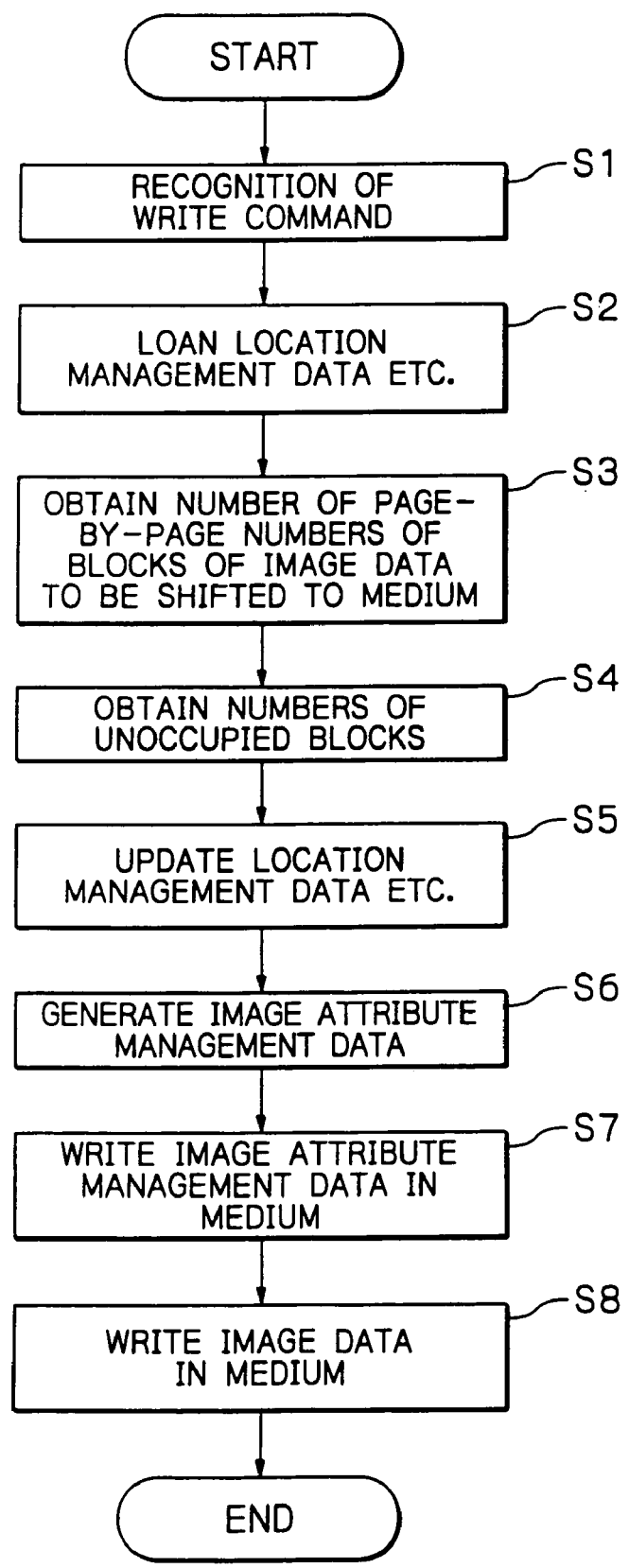
FIGS. 15 and 16 are flowcharts each demonstrating a particular operation of the illustrative embodiment.

As shown in FIG. 15, the operator mounts the storing medium to the external image storing device 95 and then presses the copy server key 69 present on the operation panel 60. In response to the resulting write command, the main controller 70 recognizes the command (step S1) and then loads the RAM 73 thereof with the location management data and image file list data stored in the storing medium (step S2). Specifically, because the regions where the location management data and image file list data are stored are known beforehand, information indicative of such regions are set in the program beforehand. At the time of loading, the main controller 70 delivers a read request, including the such information, to the IPU 80.

In response, the CPU 88 included in the IPU 80 transfers the read request to the external image storing device 95 via the video memory controller 86. This storing device 95 reads data out of the designated regions and feeds them to the video memory controller 86. The video memory controller 86 writes the data received from the storing device 95 in the RAM 91. Further, the CPU 88 delivers the received data to the main controller 70. The CPU 71 of the main controller 70 writes the input data in the RAM 73.

The CPU 71 writes the location management data and image file list data so loaded in the hard disk drive 94 and holds them in the hard disk drive 94 so long as the storing medium is present in the external image storing device 95. If the RAM 91 is backed up by a power source, the above data may be stored in the RAM 91.

Subsequently, the main controller 70 obtains the image attribute management data from the image file to be shifted to the recording medium, as will be described specifically later. It is to be noted that while the above image file is stored in the hard disk drive 95, they have the same configuration as described with reference to FIG. 11. The main controller 70 then obtains the number of block of the individual page included in the image file, thereby producing a total number of blocks (step S3). Further, the main controller 70 references the loaded location management data in order to obtain unoccupied block numbers to be allocated to image attribute management data and image data (step S4). The main controller 70 then writes "1" in the "occupied/unoccupied" regions corresponding to the unoccupied block numbers obtained (step S5). At the same time, the main controller 70 adds the file name of the image file to the loaded image file list data (step S5). At this instant, the main controller 70 adds pointer information indicative of the head of the image file in relation to the file name also. This pointer information is the location information of the blocks allocated to image attribute management data.

After the step S5, the main controller 70 generates image attribute management data particular to the image file (step S6). Specifically, the main controller 70 updates the block numbers shown in FIG. 13, which have already been read out of the hard disk drive 94 and set as image attribute management data of the image file, by using the block numbers obtained in the step S4.

Subsequently, the main controller 70 delivers a write request to the IPU 80. The write request is accompanied by the image attribute management data and information designating a region for storing them, i.e., the location information. The CPU 88 then sends to the external image storing device 95 a write request in which the received region information and image attribute management data are representative of a write region and data, respectively. In response, the external image storing device 95 writes the image attribute management data in the designated region of the storing medium mounted thereto (step S7).

Further, the main controller 70 obtains, based on the non-updated block numbers of the consecutive pages of the image file not updated, the region of the hard disk drive 94 from which the consecutive pages should be read out. Also, the main controller 70 obtains, based on the updated block numbers of the above pages, the region of the storing medium to which the consecutive pages should be written. The main controller 70 delivers a shift request, including such two regions, to the IPU 80. In response, the IPU 88 delivers control data to the video memory controller 86 to thereby cause it to select a video path extending from the hard disk drive 94 to the external image storing device 95. The video memory controller 86 reads the consecutive pages of image data out of the hard disk drive 94 and sequentially transfers them to the external image storing device 95 via the image path selected. The external image storing device 95 writes the received image data in the storing medium (step S8).

It is to be noted that the main controller 70 updates the location management data and image file list data stored in the hard disk 94 at the same time as it updates the above-described location management data and image file list data.

Assume that a CD-RW or similar storing medium is mounted to the external image storing device 95, and that the designated page of a designated image file should be read out of the recording medium and printed on a paper sheet. This procedure will be described with reference to FIG. 16. First, the operator mounts the storing medium to the external image storing device 95 and then presses the copy server key 69 present on the operation panel 60. The main controller 70 recognizes the resulting read command (step S11) and then loads its RAM 73 with location management data and image file list data stored in the storing medium (step S12).

Because the regions where the location management data and image file list data are stored are known beforehand, information indicative of such regions are set in the program beforehand. At the time of loading, the main controller 70 delivers a read request, including the such information, to the IPU 80. In response, the CPU 88 of the IPU 80 delivers the read request to the external image storing device 95 via the video memory controller 86. The external image storing device 95 reads data out of the designated region and delivers them to the video memory controller 86. The video memory controller 86 writes the received data in the RAM 91. Further, the video memory controller 86 delivers the data stored in the RAM 91 to the main controller 70. The CPU 71 of the main controller 70 stores the input data in the RAM 73.

The CPU 71 stores the loaded location management data and image file list data in the hard disk drive 94 and holds them in the hard disk drive 94 so long as the recording medium is present in the external image storing device 95. Again, if the RAM 91 is backed up by a power source, the above data may be stored in the RAM 91.

Subsequently, the main controller 70 causes, based on the image file list data loaded in the RAM 73, the LCD touch panel 61 to display a list of image file names. The operator, watching the touch panel 61, inputs a desired page on the numeral keys 62 (or inputs only a file name when desiring all pages) (step S13). The main controller 70 obtains location information representative of a block allocated to the image attribute management data, which corresponds to the file name selected, out of the image file list data. The main controller 70 then delivers to the IPU 80 a read request in which the location information designates a region to be read out.

The CPU 88 of the IPU 80 sends a read request to the external image storing device 95 in accordance with the designation. The external image storing device 95 reads data out of the designated block of the image storing means and transfers them to the video memory controller 86. Subsequently, the main controller 70 loads the RAM 73 with the above data, i.e., the image attribute management data of the designated file, as stated earlier (step 514).

After the step S14, the main controller 70 obtains the block number of the designated page from the image attribute management data (step S15). The main controller 70 then obtains location information corresponding to the block number from the loaded location management data (step S16). Subsequently, the main controller 70 feeds to the IPU 80 a read request in which the location information designates a region to be read out.

The CPU 88 of the IPU 80 sends a read request to the external image storing device 95 in accordance with the designation, causing the device 95 to select a video path between it and the video memory 87. The external image storing device 95 reads data out of the designated block of the storing medium and transfers them to the video memory 87 via the video path (step S17). Further, the image data stored in the video memory 87 are transferred to the writing unit 27 via the memory controller 86 and selector 86 and printed on a paper sheet thereby (step S18).

It is to be noted that the loaded image attribute management data are held in the hard disk drive 94 or the RAM 73 so long as the storing medium is present in the external image storing device 95.

Figure 16:
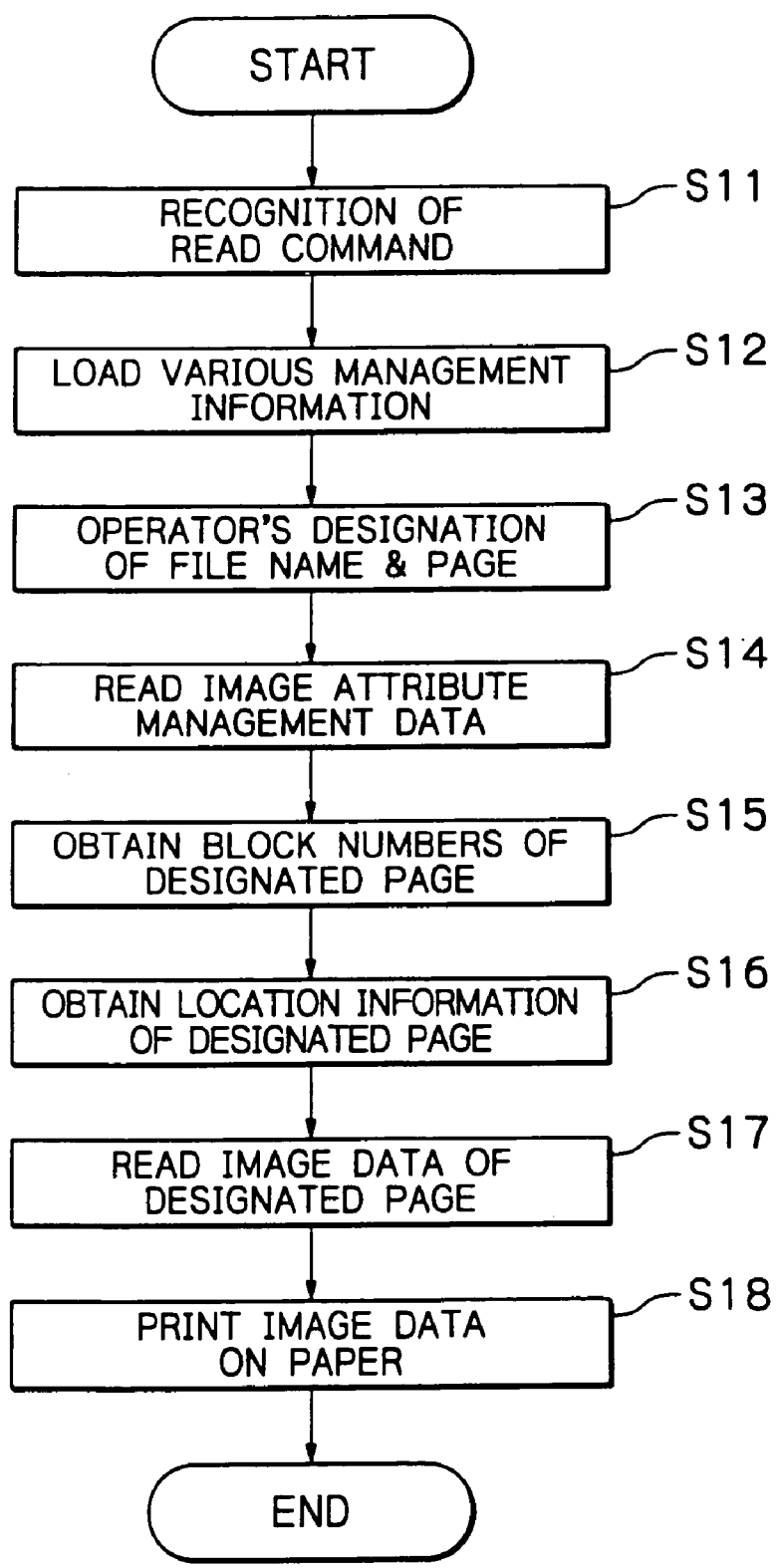

The operator may designate a plurality of pages of a single image file or even a plurality of pages of different image files, e.g., page m of an image file A and page n of an image file B. In the case of a plurality of pages of a single file, the steps S15 through S18 of FIG. 16 are repeated. When the entire image file is designated, the steps S15 through S18 are repeated a number of times corresponding to the number of pages. As for a plurality of pages of different image files, the steps 14 through S18 are repeated.

Assume that image data are written to or read out of the storing medium existing in the external image storing device 95 a second successive times. Then, the main controller 70 reads the location management data and image file list data stored in the hard disk drive 94 or the RAM 73. This is successful to increase the reading speed, compared to the case wherein such data are again read out of the storing medium.

When the storing medium is to be removed from the external image storing device 95, the location management data and image file list data stored in the medium must be replaced with the data stored in, e.g., the hard disk drive 94. For this purpose, a locking mechanism is arranged in part of the external image storing device 95 configured to receive the storing medium. The locking mechanism locks the storing medium when it is mounted to the image storing device 95. When the operator inputs a "medium removal" command on the operation panel 60, the locking mechanism unlocks the storing medium after the main controller 70 has written the location management data and image file list data of, e.g., the hard disk drive 94 in the medium. At this instant, the main controller 70 deletes the location management data, image file list data and image attribute management data of the storing medium stored in the hard disk drive 94 or the RAM 73.

An alternative embodiment of the present invention will be described hereinafter. In this embodiment, the main controller 70 generates the following data and information:

(a) image file list data listing image files stored in the internal image storing device, removable storing medium or similar image storing means;

(b) allocation data (FAT) for managing image data on a single unit image basis, e.g., a singe page basis;

(c) file structure information for managing a single unit image or a plurality of unit images as a single image file; and (d) cluster information for managing, e.g., a condition in which the individual cluster or block constituting a unit image is used.

The main controller 70 stores the image file list data, allocation data, file structure information and cluster information while relating them to image data stored in the image storing means. The allocation data corresponds to the first management information stated earlier. The file structure data corresponds to the second management information except that image numbers (pointers to allocation data) included therein are the first management information at the same time. The image file list data corresponds to the third management data except that file numbers (pointers to the file structure data) included therein are the second management data at the same time.

FIG. 17 shows a specific group of information including image file list data, allocation data (FAT), cluster information, and file structure information. Such a group of information is stored in the hard disk drive 94 and the storing medium mounted to the external image storing device 95. As shown, the first field stores the image file list data. As shown in FIG. 18 specifically, the first field stores document names (file names), user IDs and times of storage each relating to a particular record (line), which corresponds to a particular image file. These information appear in the region shown in FIG. 3. In addition, the above field stores file numbers each being attached to a particular image file.

FIG. 19 shows specific allocation data. As shown, each record (line) consists of an image number attached to a unit image (e.g. one page), the image start address of the first block (cluster) in which the image data of the unit image is stored, and image size information representative of the number of blocks of the image unit. It is to be noted that the word "address" refers to one of serial numbers sequentially attached to divided memory regions of equal size.

FIG. 20 shows specific cluster data stored in a field next to the allocation data field. As shown, each record consists of information representative of occupied/unoccupied and the address of the next block allocated to the unit image designated by the image number. If the next block allocated to the unit image is absent, "END", for example, may be written in place of the address.

In FIG. 20, continuous blocks are assigned to the unit image. However, some blocks may be skipped because the unoccupied blocks are not only continuous. Numbers positioned at the left-hand side of FIG. 20 are block numbers. Again, "occupied" and "unoccupied" are represented by "1" and "0", respectively. If desired, "END" indicative of the last block may be replaced with an address value not occurring in practice (e.g. 99999). Further, an address value not occurring in practice (e.g. 88888) may be written in the region assigned to the next block addresses in place of the occupied/unoccupied region, in which case a block with such an address value will be determined to be unoccupied.

FIG. 21 shows specific file structure information stored in a field next to the cluster data field. As shown, assuming that a unit image included in an image file is one page, then each record corresponding to a particular file stores image numbers attached to consecutive pages in order of page. This field additionally stores file attribute information that does not appear in the picture of FIG. 3, e.g., information to be used at the time of printing.

The file structure information field is followed by consecutive image file fields. When a unit image included in an image file is one page, the first page, second page and so forth are sequentially stored in this order. Because regions to be allocated to such consecutive pages are not always continuous, a plurality of unoccupied blocks are obtained on the basis of the cluster information, and then the pages are sequentially stored in the unoccupied blocks. It follows that the unoccupied blocks are not continuous, i.e., the region where a single file of image data is stored is not continuous. Also, if one page of image data overflows one block, the image data is sometimes not continuous.

Figure 22:
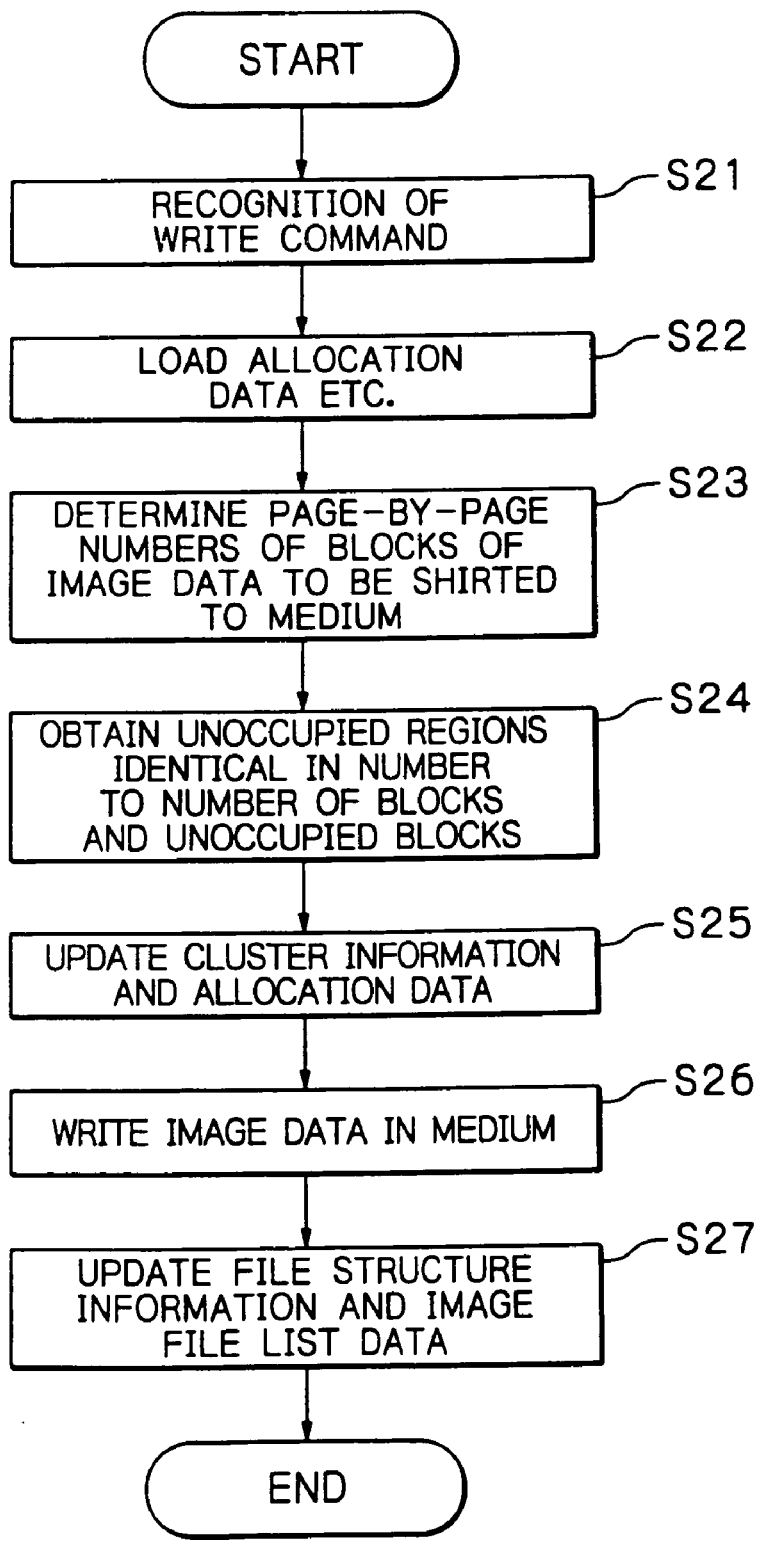
FIGS. 22 and 23 are flowcharts each demonstrating a particular operation of the alternative embodiment.

Assume that a CD-RW or similar storing medium is removably mounted to the external image storing device 95, and that a single image file stored in the hard disk drive 94 should be written to the storing medium. FIG. 22 shows how the allocation data, cluster information, file structure information and image file list data are generated and used in the above assumed conditions. In the illustrative embodiment, the main controller 70 generates and uses such data and information. The storing medium is assumed to have stored some image files beforehand.

As shown in FIG. 22, the operator mounts the recording medium to the external image storing device 95 and then presses the copy server key 69 present on the operation panel 60. In response to the resulting write command, the main controller 70 recognizes the command (step S21) and causes the external image storing device 95 to read the image data file list data, allocation data, cluster information and file structure information out of the storing medium via the IPU 80 (step S22) so as to obtain such information.

After the step S22, the main controller 70 obtains the file number of the image file to be written to the storing medium from the image file list data and obtains image numbers corresponding to the file number. The main controller 70 then obtains image sizes corresponding to the image numbers from the allocation data to thereby determine a total number of blocks required (step S23). Subsequently, the main controller 70 references the cluster information in order to obtain unoccupied regions for the image file, which correspond in number to the total number of blocks, and block numbers attached to the unoccupied regions (step S24).

Further, by referencing the allocation data, the main controller 70 obtains unused image numbers whose image start addresses and image sizes are blank over all of the pages of the image file (when a unit image is one page). The main controller 70 then writes the address of the first one of the consecutive blocks while relating it to the image number of the first page of the image file. At the same time, the main controller 70 writes the image size obtained from the allocation data while relating it to the above image number. Further, the main controller 70 updates the first block to "occupied" and writes the address (calculated from the block number) of the second block next to the above block. The main controller 70 repeats such a procedure with the successive pages of the image file in order to update the allocation data and cluster information for the storing medium (step S25). The main controller 70 then delivers the image data of the first image file to the IPU 80 and causes it to write the image data in the blocks obtained in the storing medium (step S26).

After the step S26, the main controller 70 writes the image numbers in the file structure information for the storing medium and adds the image file list data of the first image file to the image file list data to thereby update the data (step S27). That is, the main controller 70 shifts the image file list data of the first image file from the image file list data stored the hard disk drive 94 to the image file list data for the storing medium.

Assume that a CD-RW or similar recording medium is mounted to the external image storing device 95, and that the designated page of a designated image file should be read out of the recording medium and printed on a paper sheet. This procedure will be described with reference to FIG. 23. First, the operator mounts the recording medium to the external image storing device 95 and then presses the copy server key 69 present on the operation panel 60. The main controller 70 recognizes the resulting read command (step S31) and then loads its RAM 73 with image file list data, allocation data, cluster information and file structure information stored in the recording medium (step S32).

More specifically, because the regions where the image file list data, allocation data, cluster information and file structure are stored are known beforehand, information indicative of such regions are set in the program beforehand. At the time of loading, the main controller 70 delivers a read request, including the such information, to the IPU 80. In response, the CPU 88 of the IPU 80 delivers the read request to the external image storing device 95 via the video memory controller 86. The external image storing device 95 reads data out of the designated region and delivers them to the video memory controller 86. The video memory controller 86 writes the received data in the RAM 91. Further, the video memory controller 86 delivers the data stored in the RAM 91 to the main controller 70. The CPU 71 of the main controller 70 stores the input data in the RAM 73.

The CPU 71 stores the loaded image file list data, allocation data, cluster information and file structure information in the hard disk drive 94 and holds them in the hard disk drive 94 so long as the recording medium is present in the external image storing device 95. Again, if the RAM 91 is backed up by a power source, the above data may be stored in the RAM 91.

Subsequently, the main controller 70 causes, based on the image file list data loaded in the RAM 73, the LCD touch panel 61 to display a list of document names (image file names) and user IDs. The operator, watching the touch panel 61, inputs a desired page on the numeral keys 62 (or inputs only a file name when desiring all pages) (step S33) The main controller 70 obtains the file number of the image file selected by referencing the image file list data and then obtains an image number attached to a page designated by the file number and present in the file structure information (step S34). For example, if the file number and page number are respectively 003 and 2 in FIG. 21, the main controller 70 obtains an image number 008. Further, the main controller 70 obtains from the allocation data the start address of the first block corresponding to the image number obtained and then obtains from the cluster information the addresses of successive blocks of the same page (step S35). Thereafter, the main controller 70 delivers a read request including the addresses and data lengths to the IPU 80.

The CPU 88 of the IPU 80 sends a read request to the external image storing device 95 in accordance with the designation, causing the device 95 to select a video path between it and the video memory 87. The external image storing device 95 reads data out of the designated blocks of the storing medium and transfers them to the video memory controller 86 via the above video path (step S36). Subsequently, the CPU 88 delivers the image data stored in the video memory 87 to the writing unit 27 via the video memory controller 86 and selector 85 in response to a request received from the main controller 70. The writing unit 27 prints the image data on a paper sheet (step S37).

Figure 23:
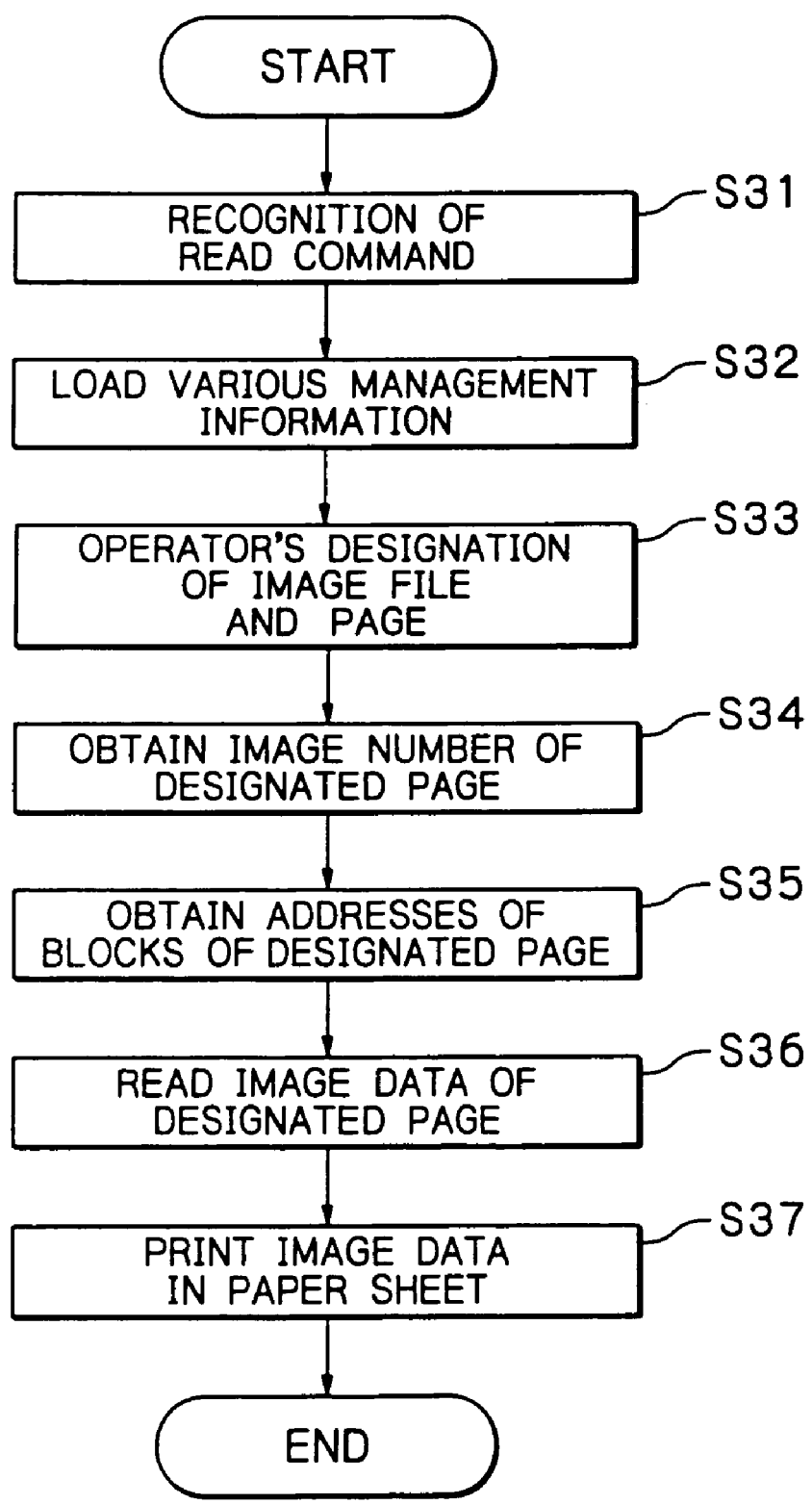

The operator may designate a plurality of pages of a single image file or even a plurality of pages of different image files, e.g., page m of an image file A and page n of an image file B. In the case of a plurality of pages of a single file, the steps S34 through S37 of FIG. 23 are repeated. When the entire image file is designated, the steps S34 through S37 are repeated a number of times corresponding to the number of pages. When a plurality of pages of different image files are designated, the operator is urged to designate the desired image files and pages in the step S33. The file numbers designated each are related to one or more of page numbers thereof and then stored in the RAM 73. Thereafter, the steps S34 through S37 are repeated.

Assume that image data are written to or read out of the storing medium existing in the external image storing device 95 a second and consecutive times. Then, the main controller 70 reads the image file list data, allocation data, cluster information and file structure information stored in the hard disk drive 94 or the RAM 73. This is successful to increase the reading speed, compared to the case wherein such data are again read out of the storing medium.

When the storing medium is to be removed from the external image storing device 95, the image file list data, allocation data, cluster information and file structure information stored in the medium must be replaced with the data stored in, e.g., the hard disk drive 94. For this purpose, a locking mechanism is arranged in part of the external image storing device 95 configured to receive the storing medium. The locking mechanism locks the storing medium when the medium is mounted to the image storing device 95. When the operator inputs a "medium removal" command on the operation panel 60, the locking mechanism unlocks the storing medium after the main controller 70 has written the above data and information of, e.g., the hard disk drive 94 in the medium. At this instant, the main controller 70 deletes the various management data stored in the hard disk drive 94 or the RAM.

While the illustrative embodiments shown and described have concentrated on a removable storing medium, the present invention is practicable even with a hard disk drive or similar image storing means built in an image processing apparatus. The unit image may be smaller than or greater than one page, if desired. A removable storing medium, for example, storing a program that causes a computer to executed the method of the present invention may be mounted to an image processing apparatus having heretofore been unable to perform the above described image information management.

In summary, it will be seen that the present invention provides an image processing apparatus having various unprecedented advantages, as enumerated below.

(1) First management information is generated for managing image data to be stored in image storing means on a single unit image basis. Also, second management information is generated for managing one or more unit images as a single image file. It is therefore possible to read the entire designated image data made up of a plurality of pages or only desired part of the entire image data out of the image storing means.

(2) Part of image data stored in an image file, which is specified by the second management information, is specified by the first management information on a unit image basis. It is therefore possible to read the entire designated image data made up of a plurality of pages or to read, at a high speed, only desired part of the entire image data out of the image storing means.

(3) Third management information listing image files stored in the image storing means is generated and stored in the image storing means. This allows a list of image files to be easily read out and referenced.

(4) The first and second management information are stored in the image storing means in relation to image data. The first and second management information can therefore be read out of the image storing means storing image data, which include desired image data. This obviates an occurrence that the first and second management information relating to desired image data are lost and prevent desired image data from being read out.

(5) The image storing means is implemented by a storing medium removable from the apparatus. Therefore, even when the storing medium is shifted from the apparatus to another image processing apparatus, only desired part of the entire image data can be read out at a high speed. This also allows a list of image files to be easily read out and referenced.

(6) At least one of the first, second and third management information stored in the removable storing medium is written to storing means built in the apparatus and is held therein until the medium has been removed from the apparatus. It follows that at least one of the three kinds of management information can be obtained without being read out of the storing medium, reducing a data reading time.

(7) A method of the present invention can be stored in, e.g., the removable storing medium as a program to be executed by a computer. This storing medium maybe mounted to an image processing apparatus having heretofore been unable to perform image information management.

Various modifications will become possible for those skilled in the art after receiving the teachings of the present disclosure without departing from the scope thereof.

What is claimed is:

1. An image processing device comprising:
   a selecting section and a display section configured to allow an operator to select first information and second information, to display an image file list, which lists image files stored in a storage medium, to prompt an operator to select an image file based on the image file list and to then designate one or a plurality of pages on numeral keys, and to display a user ID representative of a user input image data in the image file list and a number of pages of the image file;

an output configured to output the one or a plurality of pages or the image file selected by the operator; and a memory configured to store output conditions at a time of selection by the operator;

wherein the selecting section allows the one or a plurality of pages of the image file from the displayed image file list to be selected, as desired; and wherein the selecting section allows pages of a plurality of different image files from the displayed image file list to be selected, as desired.

2. A device as claimed in claim 1, wherein the output conditions include a sheet size.

3. A device as claimed in claim 1, wherein the output conditions include whether or not a duplex mode operation is executed.

4. A device as claimed in claim 1, wherein the image storing medium is removably mounted to said device.

5. An image processing method for use in an image forming including a selecting section and a display section, the method comprising:

allowing an operator to select first information and second information;

displaying an image file list, which lists image files stored in an image storing medium;

prompting an operator to select an image file based on the image file list and to then designate one or a plurality of pages on numeral keys;

displaying a user ID representative of a user input image data in the image file list and a number of pages of the image file;

outputting the one or a plurality of pages or the image file selected by the operator;

allowing the one or plurality of pages of the image file from the displayed image file list to be selected, as desired;

allowing pages of a plurality of different image files from the displayed image file list to be selected, as desired; and storing output conditions at a time of selection by the operator.

6. A method as claimed in claim 5, wherein the output conditions include a sheet size.

7. A method as claimed in claim 5, wherein the output conditions include whether or not a duplex mode operation is executed.

8. A device as claimed in claim 5, wherein the image storing medium is removably mounted.

9. A method as claimed in claim 5, wherein said method is stored in a computer as a program to be executed by said computer.

* * * * *